US009058152B2

(12) United States Patent
Lo et al.

(10) Patent No.: US 9,058,152 B2

(45) Date of Patent: Jun. 16, 2015

(54) WIRELESS COMMUNICATION MODULE, PORTABLE DEVICE USING THE SAME AND METHOD FOR MANUFACTURING THE SAME

(75) Inventors: Shao-Chin Lo, Miaoli (TW); Min-Chung Wu, Yangmei Township, Taoyuan County (TW); Xin-Chang Chen, Taipei (TW)

(73) Assignee: RALINK TECHNOLOGY CORPORATION, Jhubei (TW)

( * ) Notice: Subject to any disclaimer, the term of this patent is extended or adjusted under 35 U.S.C. 154(b) by 542 days.

(21) Appl. No.: 12/628,063

(22) Filed: Nov. 30, 2009

(65) Prior Publication Data

US 2011/0045881 A1 Feb. 24, 2011

Related U.S. Application Data

(60) Provisional application No. 61/236,163, filed on Aug. 24, 2009.

(51) Int. Cl.

| | |
|---|---|
| ***H04M 1/00*** | (2006.01) |
| ***H05K 5/00*** | (2006.01) |
| ***G06F 1/16*** | (2006.01) |
| ***H01Q 1/22*** | (2006.01) |
| ***H01Q 21/28*** | (2006.01) |

(52) U.S. Cl.

CPC ............ *G06F 1/1616* (2013.01); *G06F 1/1698* (2013.01); *H01Q 1/2266* (2013.01); *H01Q 21/28* (2013.01)

(58) Field of Classification Search

CPC ................................ H01Q 1/2283; H05K 7/02

USPC ...................... 455/575.7; 361/679.01, 679.23

See application file for complete search history.

(56) References Cited

U.S. PATENT DOCUMENTS

| | | | | |
|---|---|---|---|---|
| 5,550,554 | A | 8/1996 | Erkocevic | |
| 6,717,801 | B1 | 4/2004 | Castell et al. | |
| 6,870,733 | B2 | 3/2005 | Castell et al. | |
| 7,557,762 | B2 * | 7/2009 | Shimasaki et al. | 343/702 |
| 2007/0164920 | A1 | 7/2007 | Chen | |
| 2007/0242421 | A1 * | 10/2007 | Goschin et al. | 361/681 |
| 2007/0282208 | A1 | 12/2007 | Jacobs et al. | |
| 2009/0047989 | A1 | 2/2009 | Harmon et al. | |
| 2009/0180451 | A1 | 7/2009 | Alpert et al. | |
| 2010/0073241 | A1 * | 3/2010 | Ayala Vazquez et al. | 343/702 |

* cited by examiner

*Primary Examiner* — Omoniyi Obayanju

(74) *Attorney, Agent, or Firm* — Sawyer Law Group, P.C.

(57) ABSTRACT

The present invention discloses a wireless communication module, comprising a substrate; at least one wireless module, disposed on the substrate; and a module which does not emit wireless signals can be disposed on the substrate as well. The wireless communication module forms a compact structure and removes the need for RF shielded coaxial cables within the communication module. The present invention further discloses a portable device, which comprises a display part comprising a communication module; and a host part coupled to the display part; wherein the communication module is deposited on top of display part for better reception.

19 Claims, 9 Drawing Sheets

300
304
306 308 312 305 314 309 307
Antenna
Processing unit
Processing unit
Antenna
301
303
311
302

Peak gain
=1.9 dBi

WIRELESS COMMUNICATION MODULE, PORTABLE DEVICE USING THE SAME AND METHOD FOR MANUFACTURING THE SAME

CROSS REFERENCE TO RELATED APPLICATIONS

This application claims the benefit of U.S. Provisional Application No. 61/236,163, filed on Aug. 24, 2009 and entitled "Wireless Communication Module, Portable Device Using the Same and Method for Manufacturing the Same," the contents of which are incorporated herein by reference.

FIELD OF THE INVENTION

The present invention relates to a wireless communication module, and more particularly, to a multi-function wireless communication module and a portable device using the same.

BACKGROUND

With the advancement of wireless communication technology, various wireless communication systems are developed, such as Bluetooth (BT), wireless local area network (WLAN), 3G, LTE, high speed packet access (HSPA), WiMAX, etc. Supporting various wireless communication systems in a consumer electronic device (such as notebook/laptop/personal computer, PDA, hand-held videogame device, etc.), is a key and remarkable feature. Therefore, how to integrate multiple wireless communication modules and antennas in a restricted space of an electronic device has become a challenge because layout method, isolation, interference, efficiency, or any other factors, which may affect performance of the wireless communication systems, should be considered at the same time.

For example, please refer to FIG. 1, which is a schematic diagram of a notebook 100 of the prior art. The notebook 100 includes a WLAN processing unit 105 and a BT processing unit 106 in a host part 102, to process signals of WLAN and BT respectively. To effectively receive or transmit wireless signals of WLAN and BT, antennas 107 and 109 are respectively disposed in a display part 101 of the notebook 100 for better reception. The antennas 107 and 109 are coupled to antenna connectors on the WLAN processing unit 105 and the BT processing unit 106 through metal coaxial cables 108 and 110, respectively. The metal coaxial cables 108 and 110 are required to be isolated, to prevent interference while transmitting signals to the corresponding units, because both WLAN and BT can be operate in the ISM frequency band around 2.4 GHz. In the prior art, the required isolation is achieved by covering the coaxial cables 108 and 110 with metal isolation layer.

In addition, the WLAN processing unit 105 and the BT processing unit 106 are coupled to a main board of the notebook 100 via a mini PCI-e interface and a USB connector, which takes much space, and is a disadvantage because all the portable devices have to be thin, light and small. Moreover, the isolated coaxial cables and the antenna connectors on the processing units also increase manufacturing cost. Furthermore, the huge number of parts and processing steps also make the manufacturing process complicated.

Therefore, there is a need to design a wireless communication module that is small and easy to be integrated into a portable device.

Accordingly, there is a desire therefore for a system and method to allowing for improved communication between devices that include a wireless interface. This system should be easy to implement, cost effective, and adaptable to existing systems. The present invention addresses such a need.

SUMMARY OF THE INVENTION

It is therefore a primary objective of the claimed invention to provide a wireless communication module, a portable device using the same and method for manufacturing the same.

The present invention discloses a wireless communication module, comprising a substrate; at least one wireless module, disposed on the substrate; and a module which does not emit wireless signals, can be disposed on the substrate as well. This wireless communication module form a compact structure and remove the need for RF shielded coaxial cables within the communication module.

The present invention further discloses a portable device, which comprises a display part comprising a communication module; and a host part coupled to the display part; wherein the communication module is deposited on top of display part for better reception and remove the need of RF shielded coaxial cables within the communication modules. The communication module is coupled to the host part by one or more series-to-deseries connection for performing a plurality of formats of wireless communications.

A method for manufacturing a portable device with a communication module, the method comprising the steps of disposing the communication module into a display part of the portable device; and coupling the communication module with a host part of the portable device.

These and other objectives of the present invention will no doubt become obvious to those of ordinary skill in the art after reading the following detailed description of the preferred embodiment that is illustrated in the various figures and drawings.

DETAILED DESCRIPTION OF PREFERRED EMBODIMENTS

The present invention relates generally to wireless systems and more particularly relates to a method and system for allowing for direct communications between devices in such systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
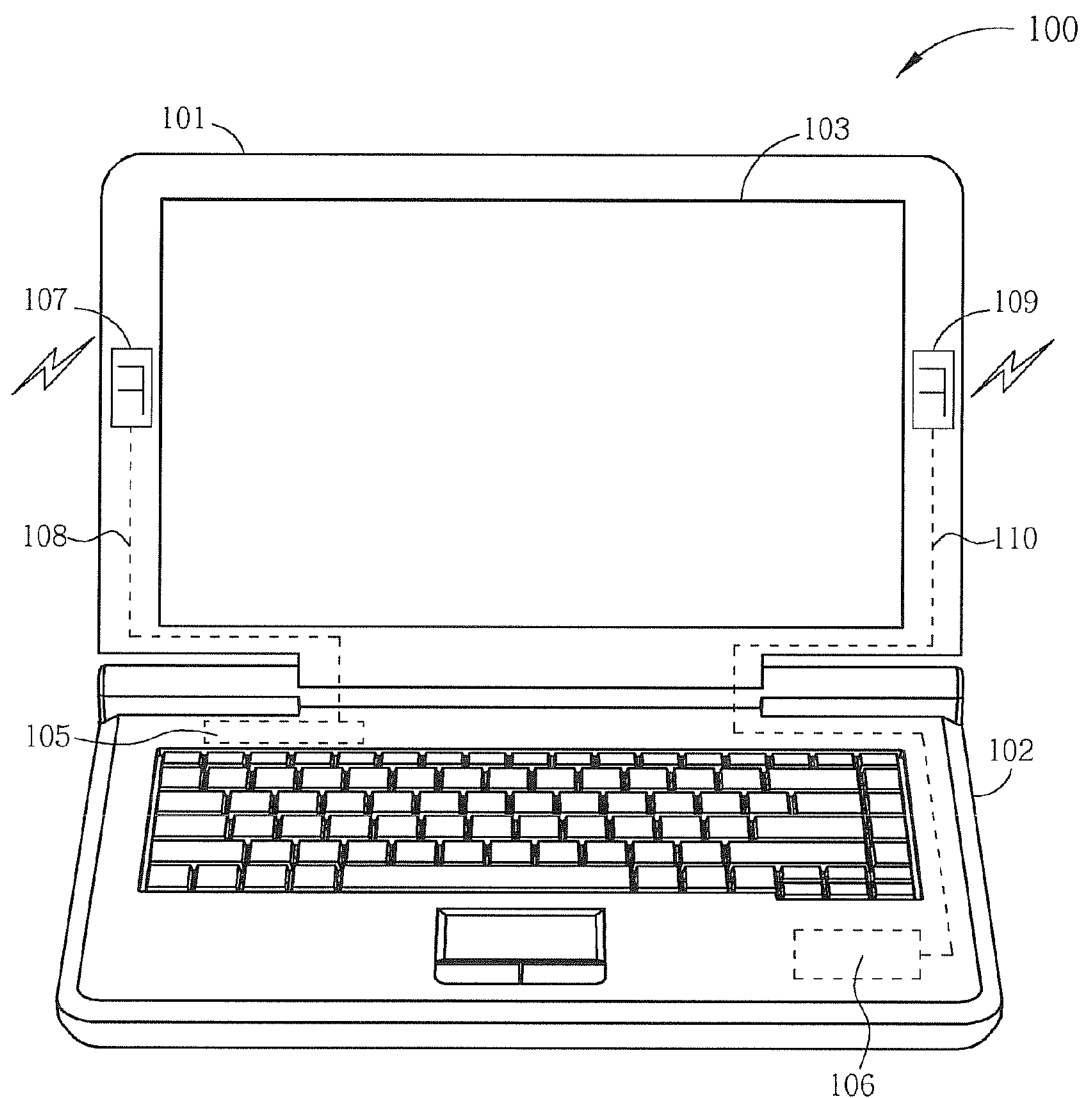
FIG. 1 is a schematic diagram of a notebook of the prior art.
Figure 2:
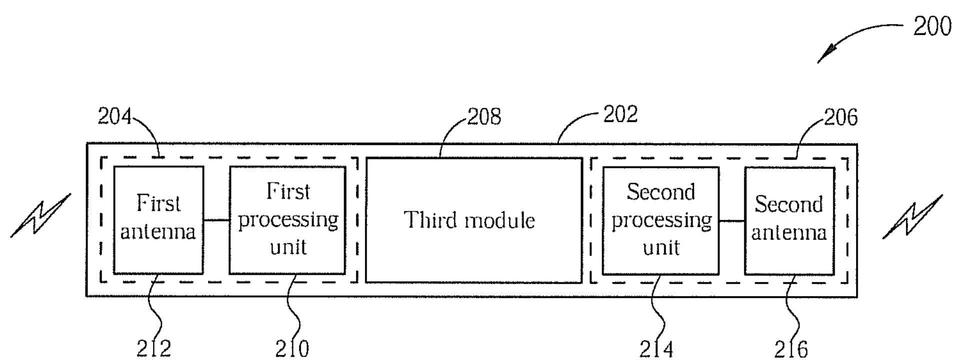
FIG. 2 is a schematic diagram of a wireless communication module according to an embodiment of the present invention.

Please refer to FIG. 2, which illustrates a schematic diagram of a wireless communication module 200 according to an embodiment of the present invention. The wireless communication module 200 comprises a substrate 200 and a plurality of modules. In this embodiment the modules include a first wireless communication module 204, a second wireless communication module 206, and a third module 208. The first wireless communication module 204, the second wireless communication module 206 and the third module 208 are disposed on the substrate 202. The first wireless communication module 204 is utilized for performing operations corresponding to a first wireless communication system, and includes a first processing unit 210 and a first antenna 212. The first processing unit 210 receives or transmits signals of the first wireless communication system via the first antenna 212, and can be composed of various elements, circuits, firmware, etc. as long as signals of the first wireless communication system are accurately processed. The second wireless communication module 206 is utilized for performing operations corresponding to a second wireless communication system, and includes a second processing unit 214 and a second antenna 216. The second processing unit 214 receives or transmits signals of the second wireless communication system via the second antenna 216, and can also be composed of various elements, circuits, firmware, etc. as long as signals of the second wireless communication system are accurately processed. As can be seen from FIG. 2, the third module 208 is between the first wireless communication module 204 and the second wireless communication module 206, and can be a camera module or any other devices that do not emit wireless signals of a certain wireless communication system. It should be understood by one of ordinary skill in the art that although three modules are disclosed in the embodiment of FIG. 2, there may be any number of modules located on the substrate and that use would be within the spirit and scope of the present invention.

In short, the wireless communication module 200 provides a function not related to communication via the third module 208, and supports operations of both the first and the second wireless communication systems via the first wireless communication module 204 and the second wireless communication module 206. Since the three modules 204, 206 and 208 and associated antennas are formed in a compact structure, high-cost isolated coaxial cables between antennas 212, 216 and processing units 210, 214 can be eliminated, so as to save cost. Accordingly, the need for RF shielded isolated coaxial cables within the communication module is removed. Note that, each of the first and the second wireless communication systems is not limited to any wireless communication system, and can be WLAN (such as IEEE 802.11, 11a, 11b, 11g, 11n, etc.), BT, 3G, LTE, HSPA, etc. Thus, the first wireless communication module 204 and the second wireless communication module 206 can respectively be a WLAN module, a BT module, a 3G module, a HSPA module or any other wireless modules. In addition, to enhance isolation, the antennas 212 and 216 are preferably formed near the two edges of the wireless communication module 200, and can be any formats, such as monopole, PIFA, etc. Also, the antennas 212 and 216 can be printed antennas on the substrate 202, or formed by metal plates, which is not limited herein.

Moreover, in order to reduce interference among the plurality of modules 204, 206 and 208, a distance from the antenna 212 of the first wireless module 204 to the third module 208 is preferably based on a quarter to half of a wavelength of wireless signals of the first communication system, i.e. signals used by the first wireless module 204. Similarly, a distance from the antenna 216 of the second module 206 to the third module 208 is preferably based on a quarter to half of a wavelength of wireless signals of the second communication system, i.e. signals used by the second wireless module 206.

Figure 3:
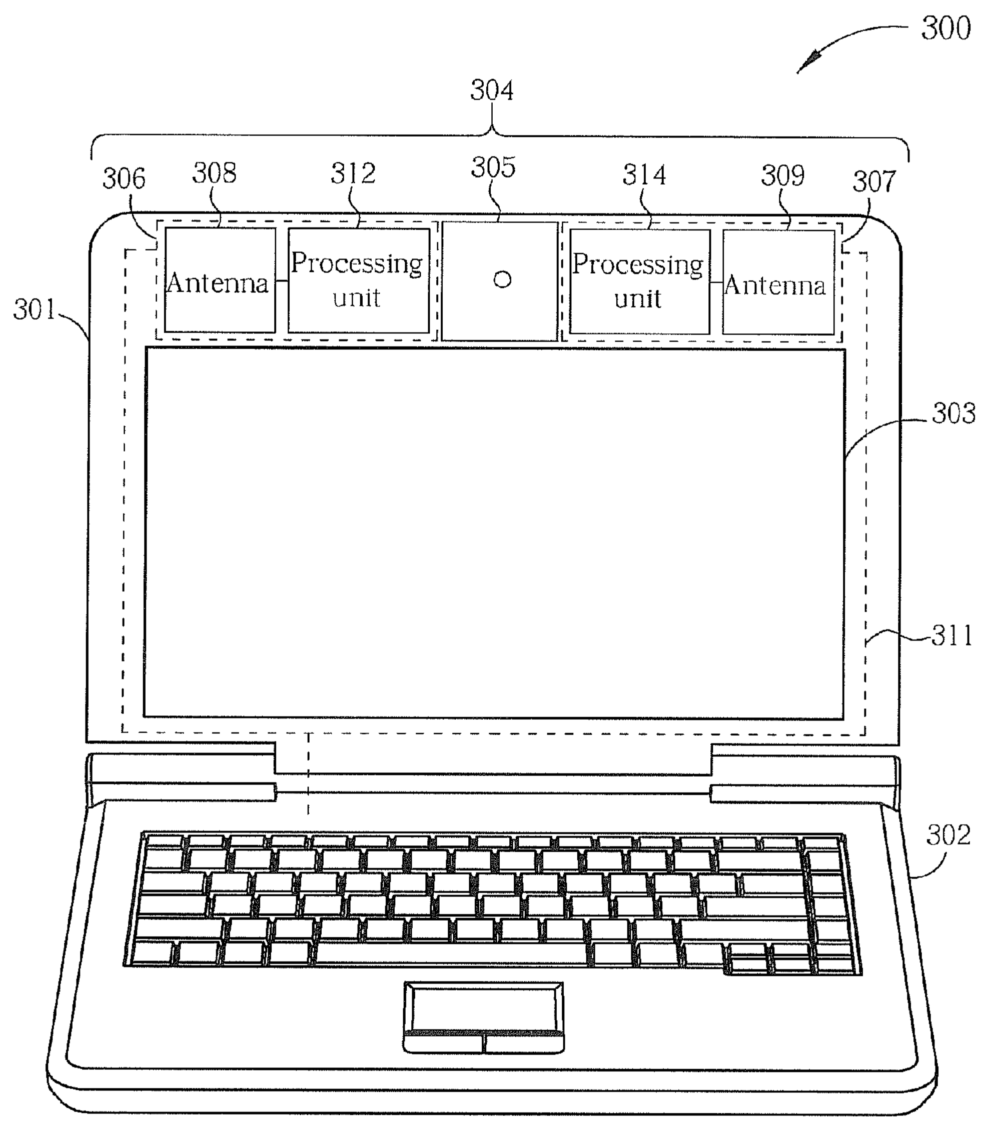
FIG. 3 is a schematic diagram of a portable device according to an embodiment of the present invention.

Furthermore, since the plurality of modules 204, 206, 208 are formed on the same substrate 202, only one or multiple connectors may be required to connect the modules to a system. These connectors can be series-to-deseries connectors such as PCIe, USB, etc. Certainly, other different connectors may be used for each module due to system design considerations. For example, please refer to FIG. 3, which is a schematic diagram of a portable device 300 according to an embodiment of the present invention. The portable device 300 has a display part 301 and a host part 302. The display part 302 has a display 303 to show information from the host part 302. A combo module 304, designed according to the wireless module 200 shown in FIG. 2, is disposed in the display part 301 and on top of the display 303 for better reception, and comprises a first wireless module 306, a second wireless module 307, and a camera module 305. The first wireless module 306 comprises an antenna 308 and a processing unit 312 formed thereon, while the second wireless module 307 also comprises an antenna 309 and a processing unit 314 formed thereon. The antennas 308 and 309 can be printed, metal-plate, or other types of antennas. Since the antennas 308, 309 and the processing modules 312, 314 are formed in the compact structure, the high-cost isolated coaxial cables between antennas 308, 308 and processing units 312, 314 can be eliminated, such that only one or two couplings are needed between the wireless modules 306, 307 to the host part 302, and thus, manufacturing cost is reduced. In addition, since the wireless modules 306, 307 are disposed on top of the display 303, the wireless modules 306, 307 are farther away from the host part 302 and the user. Therefore, wireless signals from the wireless modules 306, 307 do not cause any interference to devices in the host part 302, such as a microphone, high speed digital clocks, etc. If a size of the display 303 is large enough, the distance from the wireless modules 306, 307 to the user is increased and thus unnecessary to perform SAR (Specific Absorption Rate Testing).

In order to reduce interference, a distance from the antenna 308 of the first wireless module 306 to the camera module 305 is preferably based on a quarter to half of a wavelength of wireless signals used by the first wireless module 306. Similarly, a distance from the antenna 309 of the second module 307 to the camera module 305 is preferably based on a quarter to half of a wavelength of wireless signals used by the second wireless module 309.

Moreover, since the plurality of modules 305, 306 and 307 form the combo module 304, only one conducting wire 310 may be required to connect the modules to the host part 302. However, an additional conducting wire 311 may also be used due to other system design consideration. According to an embodiment of the present invention, a common connector, such as a PCIe, USB or other connector, can be used to couple the combo module 304 to the host part 302.

Figure 4A:
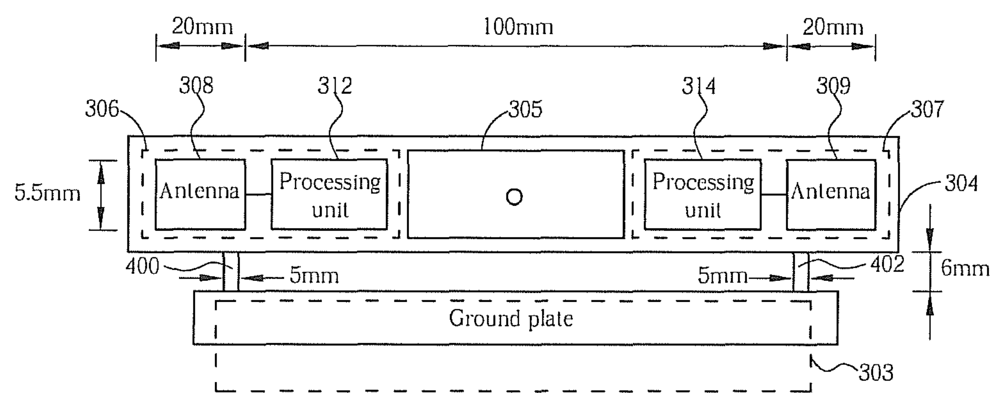
FIG. 4A is a schematic diagram of the portable device shown in FIG. 3 including grounding connectors.
Figure 4B:
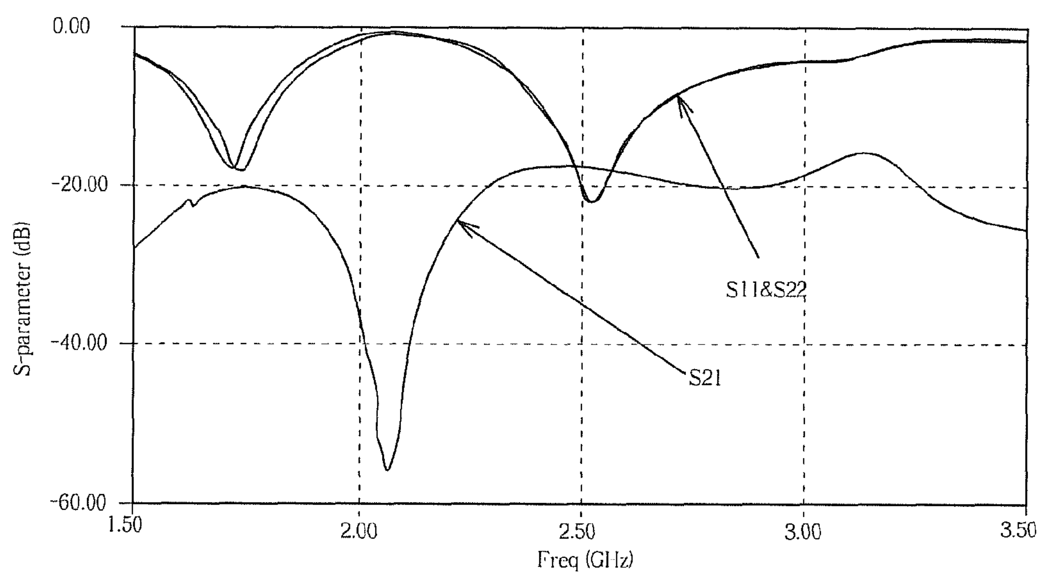
FIG. 4B is a schematic diagram of frequency response corresponding to the portable device shown in FIG. 4A.
Figure 5A:
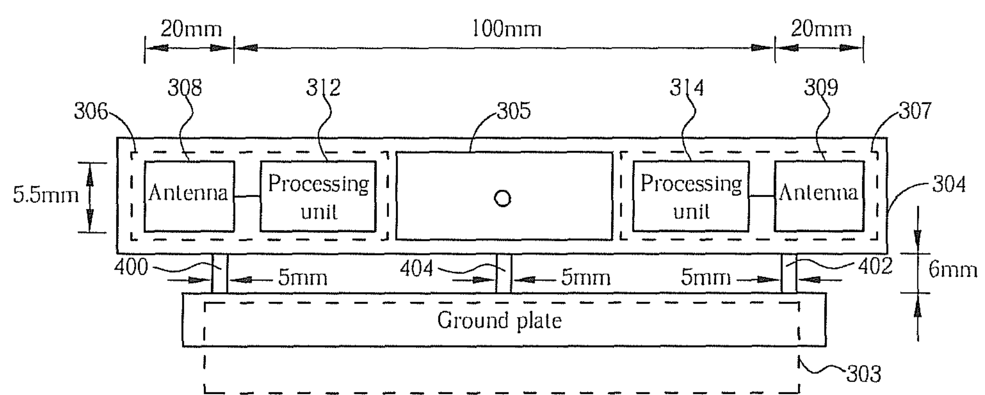
FIG. 5A is a schematic diagram of the portable device shown in FIG. 4A including an extra grounding connector.
Figure 5B:
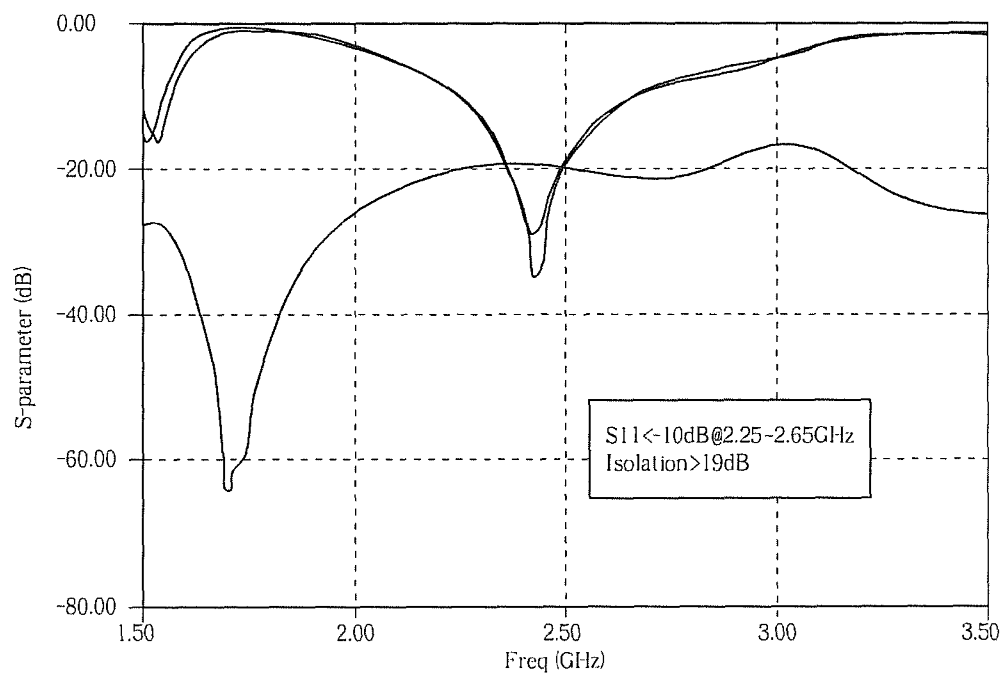
FIG. 5B is a schematic diagram of frequency response corresponding to the portable device shown in FIG. 5A.
Figure 5C:
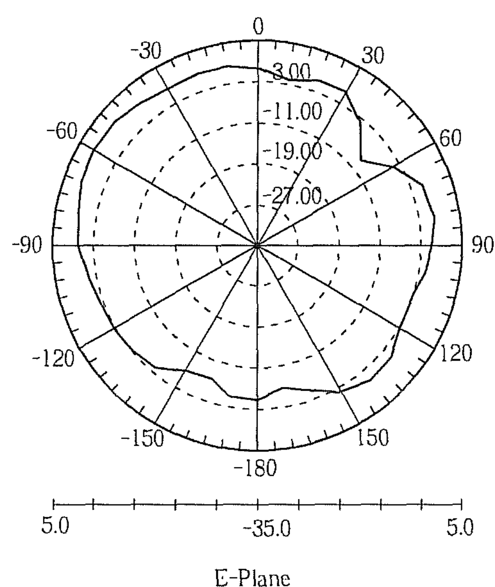
FIGS. 5C and 5D are schematic diagrams of radiating patterns corresponding to the portable device shown in FIG. 5A.
Figure 5D:
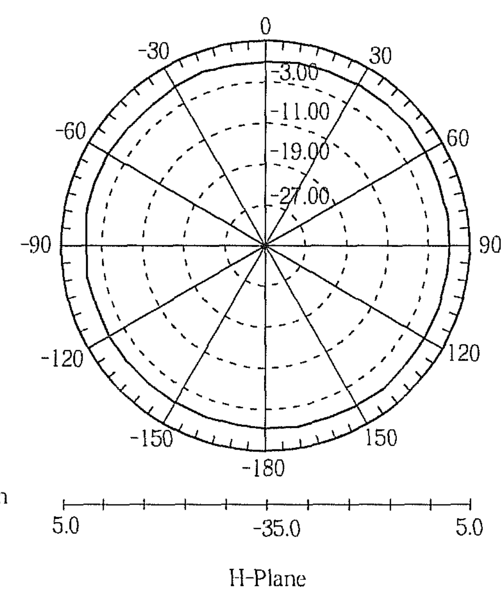

In addition, to further enhance performance of the combo module 304, additional grounding connectors can be added between a ground plane of the display 303 and the combo module 304. For example, in FIG. 4A, grounding connectors 400, 402 are added between the ground plane of the display 303 and the wireless modules 306, 307, where sizes thereof are taken as an example. In such a situation, the corresponding frequency response is shown in FIG. 4B, where isolation is around 17.5 dB. Note that, the camera module 305, e.g. web cam, is a device generating lots of noises affecting the first and second wireless modules 306 and 307, and the generated noises can only be transferred to ground via the grounding connectors 400, 402 shown in FIG. 4A. Therefore, in FIG. 5A, another grounding connector 404 is further added between the ground plane of the display 303 and the camera module 305, and is utilized for transferring noise generated by the camera module 305 to ground, to avoid influence on the wireless modules 306 and 307. The corresponding frequency response is shown in FIG. 5B, where isolation is around 19 dB, and the radiating pattern is almost omni-radiating as shown in FIGS. 5C and 5D. The grounding connectors 400, 402 and 404 provide extra ground routes between the ground plate of the display 303 and the combo module 304, and can enhance isolation as well as performance of the combo module 304. Note that, sizes of each component of the combo module 304 and the grounding connectors 400, 402 and 404 shown in FIGS. 4A and 5A are examples, and should be well designed according to system requirements, in order to maintain normal function.

Note that, the above-mentioned embodiments are utilized for narrating the concept of the present invention, and those skilled in the art can make modifications and alterations accordingly. For example, the combo module 304 (or the wireless communication module 200) can include any amount of wireless modules, not limited to two. Each of the wireless modules can be a WLAN module, a BT module, a 3G module, a HSPA module or any other wireless module, and may include multiple antennas, which is so-called MIMO (multi-input Multi-output) structure.

Figure 6:
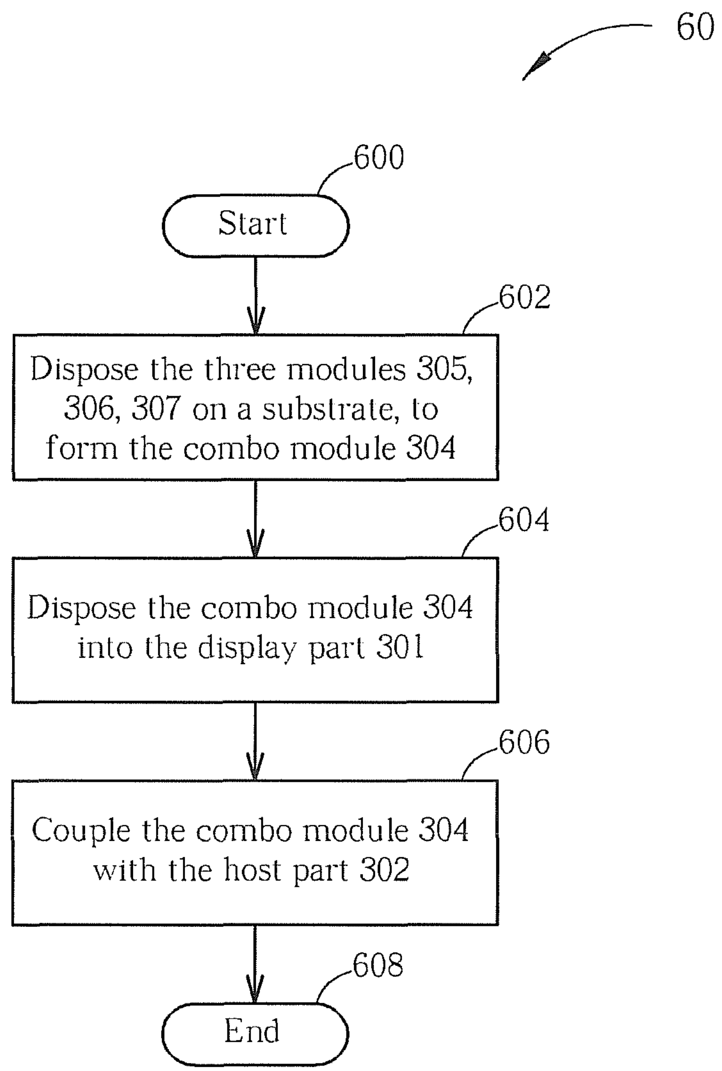
FIG. 6 is a schematic diagram of a manufacturing process according to an embodiment of the present invention.

As to manufacturing of the combo module 304, the present invention further provides a manufacturing process 60 as shown in FIG. 6. The manufacturing process 60 comprises the following steps:

Step 600: Start.

Step 602: Dispose the plurality of modules 305, 306, 307 on a substrate, to form the combo module 304.

Step 604: Dispose the combo module 304 into the display part 301.

Step 606: Couple the combo module 304 with the host part 302.

Step 608: End.

The process 60 is utilized to form the combo module 304 in the portable device 300, and the related description can be referred to the above description.

In summary, the present invention forms the plurality of wireless modules in a compact structure disposed into a display part of the portable device, such that high-cost isolated coaxial cables can be eliminated, and the manufacturing process is simplified. Therefore, the present invention can save cost, enhance manufacturing efficiency, and reduce time to market.

Those skilled in the art will readily observe that numerous modifications and alterations of the device and method may be made while retaining the teachings of the invention. Accordingly, the above disclosure should be construed as limited only by the metes and bounds of the appended claims.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A wireless communication module, comprising:
 a substrate;
 two wireless modules horizontally disposed on the substrate, wherein the two wireless modules each include an antenna and a processing unit; and
 a module which does not emit wireless signals, disposed on the substrate in between the two wireless modules,
 wherein a distance between each antenna and the module is based on a half to a quarter of the wavelength of a signal used by each wireless module, and the two wireless modules and the module form a compact structure and remove the need for RF shield coaxial cables within the communication module.

2. The wireless communication module of claim 1, wherein the module which does not emit wireless signals is a camera module.

3. The wireless communication module of claim 1, wherein the two wireless modules comprise a first wireless module disposed on the substrate and a second wireless module disposed on the substrate.

4. The wireless communication module of claim 3, wherein the first wireless module comprises a wireless local area network (WLAN) module.

5. The wireless communication module of claim 3, wherein the first wireless module comprises a first antenna on an edge of the substrate.

6. The wireless communication module of claim 5, wherein the first antenna is a printed antenna on the substrate.

7. The wireless communication module of claim 3, wherein the second wireless module comprises a second antenna on another edge end of the substrate.

8. The wireless communication module of claim 7, wherein the second antenna is a printed antenna on the substrate.

9. The wireless communication module of claim 1, wherein the two wireless modules comprise a multiple-input multiple-output (MIMO) module with multiple antennas.

10. The wireless communication module of claim 1, further comprising a connector to couple the two wireless modules to the module.

11. The wireless communication module of claim 3, further comprising a first connector to couple the first wireless module to a system, and a second connector to couple the second wireless module to the system.

12. The wireless communication module of claim 3, further comprising:
 a first grounding connector to couple the first wireless module to a ground plate; and
 a second grounding connector to couple the second wireless module to the ground plate.

13. The wireless communication module of claim 12, further comprising a third grounding connectors to couple the module to the ground plate.

14. The wireless communication module of claim 1, wherein the wireless communication module is coupled to a portable device via a display part,
 wherein the portable device further comprises a host part coupled to the display part,
 wherein the portable device performs a plurality of formats of wireless communication.

15. A method for manufacturing a portable device with a wireless communication module, the method comprising the steps of:

disposing the wireless communication module into a display part of the portable device; wherein the wireless communication module comprises: a substrate; two wireless modules horizontally disposed on the substrate, wherein the two wireless modules each include an antenna and a processing unit; and a module which does not emit wireless signals, disposed on the substrate in between the two wireless modules, wherein a distance between each antenna and the module is based on a half to a quarter of the wavelength of a signal used by each wireless module, and the two wireless modules and the module form a compact structure and remove the need for RF shield coaxial cables within the communication module; and coupling the wireless communication module with a host part of the portable device.

16. The method of claim 15, wherein the step of coupling the wireless communication module with the host part of the portable device comprises:

coupling a connector to the host part for coupling the wireless communication module to the host part.

17. The method of claim 15 wherein the two wireless modules comprise a first wireless module disposed on the substrate and a second wireless module disposed on the substrate.

18. The method of claim 17, wherein the step of coupling the wireless communication module with the host part of the portable device comprises:

coupling a first connector to the host part to couple the first wireless module to the host part; and coupling a second connector to the host part to couple the second wireless module to the host part.

19. The method of claim 15, further comprising:

forming a plurality of grounding connectors between the wireless communication module and a ground plate of the display part.

* * * * *